Jan. 31, 1956  R. L. ALTICK  2,732,965
EDGE BINDING DEVICE AND METHOD
Filed March 17, 1953
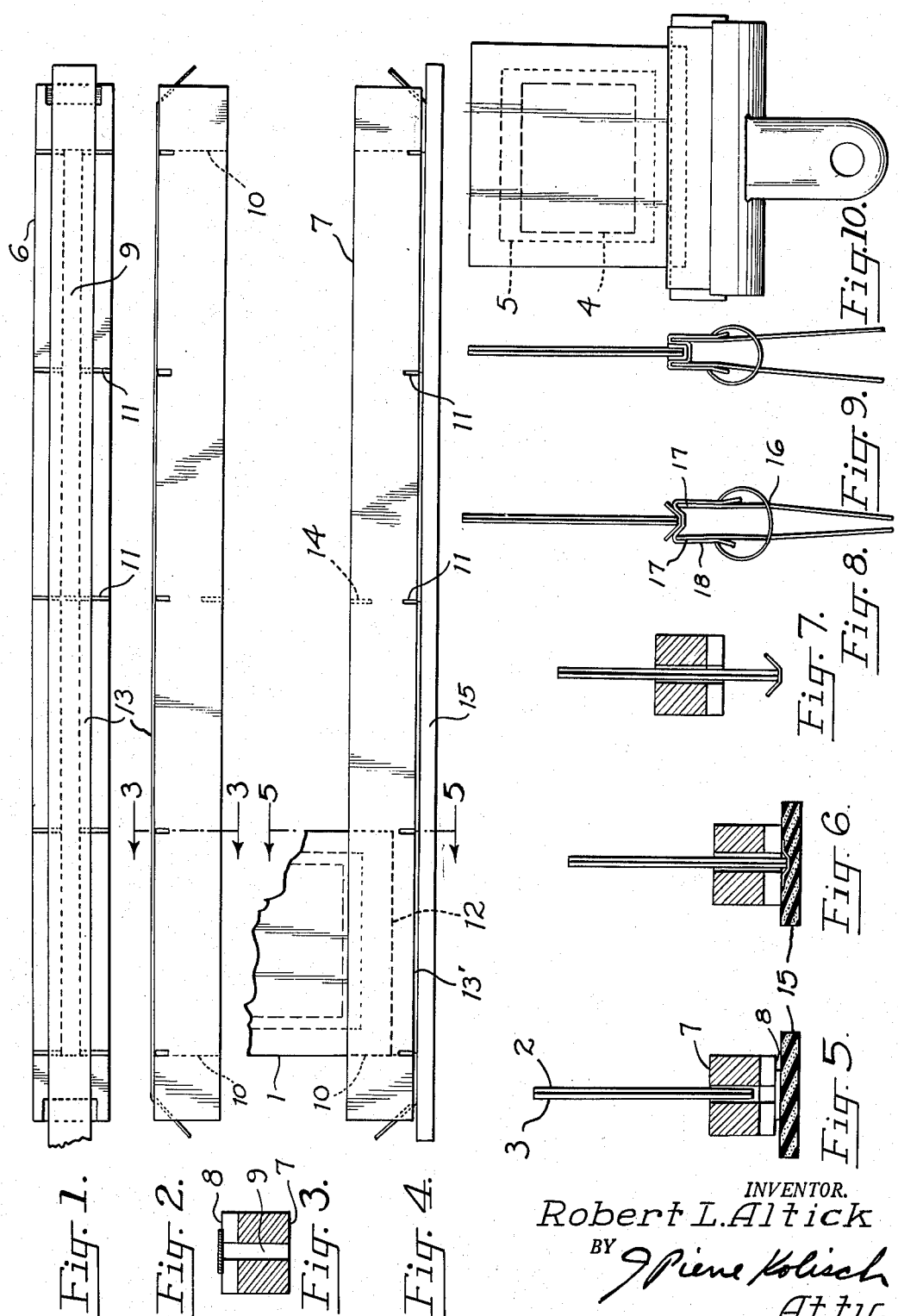
INVENTOR.
Robert L. Altick
BY
Atty.

United States Patent Office 2,732,965
Patented Jan. 31, 1956

2,732,965

EDGE BINDING DEVICE AND METHOD

Robert Lawrence Altick, Oswego, Oreg.

Application March 17, 1953, Serial No. 342,955

1 Claim. (Cl. 216—61)

This invention relates to a means and method of applying binding material to the edges of two work pieces which it is desired to hold in congruent relationship.

I have found that my invention is particularly useful in making up photographic slides and therefore the invention will be described with relation to slides, although it is not intended to be strictly limited thereto.

Among people interested in photography, professional and amateur, the making up of slides is a rather painstaking operation and involves the putting together of two pieces of plate glass with the negative of a film mounted therebetween. There are different ways of holding the pieces of glass together which include the use of framing members of metal, wood or tape. The commonest way of fastening two pieces of glass together into a slide is by pressure sensitive tape which is stuck along the contacting edges of the pieces. This is an awkward and slow process because of the tendency of the pressure sensitive tape to be unruly and, according to existing methods, it is not assured that the edges of the slide will be evenly and smoothly bound.

According to my invention, even an unskilled person will be able to make up perfect slides at a fraction of the cost and time now necessary to make up a similar slide.

According to my invention there is provided an elongated member having a longitudinal slot therethrough. A plurality of transverse slits are provided in the bottom of the member. A piece of pressure sensitive tape is stuck to the bottom of the member over the slot and slits, and cut into lengths at the slits. The slits are spaced from one another a distance corresponding to the length of the two pieces of glass which are to be bonded together into a slide. The pieces of glass are held in congruent relationship and pushed through the slot from the top to the bottom until one edge engages the piece of tape lying on the bottom of the member. As the two pieces of glass are pushed through the slot, they pick up the tape along one edge, and, simultaneously, the binding device is lifted from the table or other support permitting the pieces of glasses to be pushed completely through the slot. The tape may then be smoothed down to stick against the edges of the slide. The slide is then turned to present another edge in bonding position and the procedure is repeated, pushing the slide again through the slot and picking up the piece of tape and smoothing the tape down against the edges of the slide. This procedure is repeated until all the edges of the slide have had tape applied thereto. The binding of the slide is now complete and the latter is ready for use in a projector or other suitable instrument.

The invention will now be described in greater detail with reference to the accompanying drawings, in which:

Fig. 1 is a bottom plan view of the device according to the invention;

Fig. 2 is a side elevation of the device, bottom side up;

Fig. 3 is a section on the lines 3—3 of Fig. 2;

Fig. 4 is a side elevation of the device in operative position with a slide partially inserted therein;

Fig. 5 is a section on the lines 5—5 of Fig. 4;

Fig. 6 is a cross-section similar to Fig. 5 in which the slide has been pushed through the slot and has engaged the piece of tape;

Fig. 7 is a cross-section similar to Figs. 5 and 6 in which the slide has been pushed through the slot and is supporting the piece of tape;

Fig. 8 is an end view showing the slide and tape just prior to the application of a clamp;

Fig. 9 is the same as Fig. 8 except that the clamp has been operated to press the tape against the sides of the slide; and Fig. 10 is a side elevation of the clamp with a slide held therein.

Referring to the drawings, a photographic slide 1 is made up of two square pieces of glass 2 and 3, between which is suitable mask 4 is placed in which a negative 5 of a film is positioned. In order to use the film in a projector or the like, it is necessary to bind the four edges of the pieces of glass to one another. This is accomplished in the following manner.

An elongated rectangularly shaped member 6 has a flat top 7 and a bottom 8 and a longitudinal slot 9 extending therethrough substantially from one end of the member to the other between slide guides 10 at either end of the member. Five transverse indentations or slits 11, normal to slot 9, are provided in bottom side 8 and are spaced a distance from one another corresponding to the length 12 of one side of slide 1. A length of pressure sensitive tape 13 is stuck along the bottom of member 6 from one end to the other so that the tape covers central slot 9 as well as slits 11. The tape is cut by suitable cutting means at the transverse slits so as to divide it into four pieces, corresponding to the length of one side of the slide. Of course, slides may be made up in a variety of sizes, and, accordingly, the distance between the slits will be varied to correspond to the size of the slides. A transverse stop 14 extends across top 7 and is in vertical alignment with the center transverse slit 11.

The operation of the device is as follows: after a length of tape has been placed on the bottom side of the elongated member and cut into separate pieces, the member is placed with the tape side down on a table or other suitable support. The two congruent pieces of glass and mounted film are held together and inserted from the top side of the device through the slot. As seen in Fig. 4, the left hand side of the slide is guided in proper alignment with the tape by guide 10. As the slide is pushed through the slot, edge 12 engages length of tape 13' covering the bottom of the slot, and it will stick to the edge. The slide is pushed completely through the slot while lifting the binding device from the table thereby carrying off the tape which registers with the ends of the side of the slide. The piece of tape is then smoothed down by hand against the sides of the slide to complete the binding of one edge. The slide is rotated so as to present another edge and the process is repeated of pushing the slide through the slot and picking up the next piece of tape. In picking up the second and third pieces of tape, stop 14 is used as a guide along the vertical side of the slide to insure proper alignment between the slide edges and pieces of tape. The fourth piece of tape is similarly applied to the edge of the slide and end guide 10 guides the slide so that its edge will register with the piece of tape. The slide has now been completely bound and is ready for use.

According to a modification of the invention, a resilient member 15 of soft rubber or the like may be placed under bottom side 8 of the device, so that when the edges of the slide pass through the slot and pick up the piece of tape it will, as shown in Fig. 6, offer yielding resistance and start pressing the tape against the sides of the slide.

According to another modification of the invention, a clamp 16 having jaws 17 which are covered by a piece of resilient material 18 of soft rubber or the like may be used to hold the edges of pieces of glass 2 and 3 together during the taping operation. The clamp serves not only to hold the two pieces of glass together, but by reason of the resilient material when it is placed over an edge on which a new piece of tape has been stuck, the clamp will operate to smooth the tape to the sides of the slide, as shown in Figs. 8 and 9.

I claim:

A device for binding with pressure sensitive tape the edges of a rectangular photographic slide comprising an elongated rectangularly shaped member having a top and bottom, a longitudinal slot adapted to accommodate snugly a slide extending through said member from top to bottom and substantially from one end to the other, five shallow transverse tape severing slits in the bottom side of the member normal to the slot and spaced from one another a distance corresponding to the length of each side of a photographic slide, said bottom side being adapted to receive and hold a piece of pressure-sensitive tape extending longitudinally from one end of the member to the other covering said slot and shallow transverse slits and being severable across said slits into four pieces corresponding to the four sides of the slides, slide guide means at each extreme end of said longitudinal slot, and a stop extending transversely across the top side in vertical alignment with the middle transverse slit in the bottom, whereby the four edges of a slide may be successively pushed through said slot from top to bottom so as to apply thereto a length of tape corresponding to the length of the edges.

References Cited in the file of this patent

UNITED STATES PATENTS

| | | |
|---|---|---|
| 2,165,540 | Engel | July 11, 1939 |
| 2,299,266 | Engel | Oct. 20, 1942 |
| 2,496,406 | Patrick | Feb. 7, 1950 |
| 2,528,754 | Johnson | Nov. 7, 1950 |

FOREIGN PATENTS

| | | |
|---|---|---|
| 26,455 | Great Britain | Nov. 15, 1909 |